3,647,613
PLASTICS CONTAINERS FOR FUEL STORAGE
John Louis Scotland, Cowbridge, Wales, assignor to British Resin Products Limited, London, England
No Drawing. Filed Jan. 30, 1969, Ser. No. 795,339
Claims priority, application Great Britain, Feb. 2, 1968, 5,329/68; Mar. 13, 1968, 12,156/68
Int. Cl. B32b 27/28; B65d 89/00; C07c 21/08
U.S. Cl. 161—165         6 Claims

ABSTRACT OF THE DISCLOSURE

Containers for petroleum hydrocarbons made from high density polyethylene having a surface fluorinated to a concentration of 0.01 to 30 micrograms of fluorine per square centimetre.

---

The present invention is concerned with improvements in and relating to polyethylene storage containers for gasoline. It particularly relates to such storage containers having low permeability to gasoline.

It is known that the permeability to various organic liquids, e.g. perfume compositions and oils, of film and containers made from low density polyethylenes can be reduced by subjecting the polyethylene film or container to fluorination so that it contains from 0.03% to 3.5% by weight of fluorine. See, e.g., U.S. Pat. No. 2,811,468.

We have found that with high density polyethylene containers having a wall sufficiently thick to allow the safe storage of gasoline therein (i.e. greater than 1 millimetre) the fluorination time necessary to bring the fluorine content of the container into the disclosed range is too long for economic commercial operation. However, we have further found with containers made from this high density polyethylene that sufficient improvement in their permeability characteristics to gasoline can be brought about by fluorination to a lower fluorine content than the disclosed minimum of 0.03%.

Accordingly the present invention is a thick walled storage container for gasoline having a wall thickness greater than 1 millimetre, fabricated from a high density polyethylene or a high density copolymer of ethylene with up to 20% by weight of a copolymerisable monomer, the polyethylene or copolymer having a density in the range 0.935 to 0.965 and a melt index in the range 0.05 to 5.0 and having at least one surface of the container fluorinated to a concentration of 0.01 to 30 micrograms of fluorine per square centimetre of surface area.

The containers are particularly suitable for the storage of gasoline because of their reduced absorption of or permeability to gasoline. A particular type of container embraced by the present invention is a fuel tank for vehicles, for example land vehicles such as motor cars and lorries, or aeroplanes and boats. Such tanks would generally have a wall thickness of about 3 millimetres.

It is preferred to fluorinate only the inner surfaces of the containers.

The containers can be produced by any of the methods for moulding high density polyethylene of which the most important technically are the blow moulding and rotational moulding processes. Polymers at the lower end of the melt index range are used in the blow moulding processes and those in the higher end of the range for rotational moulding processes.

Various methods by which high density ethylene polymers can be produced are known, e.g. the Phillips, Ziegler and Standard Oil processes. Copolymers can be used and suitable copolymerisable monomers are the 1-olefins such as propylene, butene-1, pentene-1, 4-methyl pentene-1, and hexene-1. These polymers or copolymers can be blended with the low density polyethylenes provided that the density of the blend is in the range 0.935 to 0.965. The low density polyethylenes can be produced by the so called high pressure processes and have densities in the range 0.915 to 0.935.

The density of the polyethylene, copolymer or blend as quoted in this specification is measured by the method described in British standard specification 2782, Method 509A. Specimens are moulded as indicated in Appendix A of British standard specification 3412–1966 and are not annealed. Thus the densities quoted correspond to "D" densities. The melt indices quoted are measured by the method described in British standard specification 2782, part I, Method 105C using 2.16 kg. load, die diameter 0.825", land 0.315" and melt temperature 190° C. The units are in grams per 10 minutes. The molecular weight of polymers having a melt index in the range 0.05 to 5.0 will be greater than about 60,000, the molecular weight being measured by the method described by Bagley and Schreiber, equation 9, page 38, volume 58, Issue 166 of the Journal of Polymer Science, April 1962.

The containers can be fluorinated by exposing the surfaces to be treated to gaseous fluorine. Fluroination can be carried out at normal room temperatures (e.g. 15 to 25° C.), however lower temperatures can be used but this would lengthen the duration of treatment. The treatment time can be shortened by the use of higher temperatures but this would increase the hazard of fluorine fire (i.e. the reaction accelerating out of control). Convenient exposure times at room temperature are in the order of 1 to 20 minutes. It is seldom necessary to exceed 20 minutes. It is most convenient to use undiluted fluorine gas, but this can be diluted with an inert gas such as nitrogen if it is desired to reduce the speed of the reaction. The fluorine gas can be obtained from a cylinder or generated by electrolytic cells (see Kirk Othmer Encyclopedia of Chemical Technology, 2nd edition, page 510, volume 9).

The amount of fluorine required to reduce absorption by or permeability of the walls of the container to gasoline or other petroleum products is surprisingly small in comparison with the weight of the polymer. The quantity of fluorine absorbed per unit area of surface varies proportionately with the exposure time. For most applications the weight of fluorine per square centimetre of surface area of polymer can be in the range 1.0 to 10.0 micrograms.

The reason for the improved barrier properties of the fluorinated polymers is not fully understood but it is thought that the fluorine reacts either by itself or in conjunction with atmospheric oxygen or by hydrogen bonding to render the surface highly polar in chemical nature. This is supported by experimental evidence which demonstrates that the surface is more readily wetted than non-fluorinated polymer surfaces.

The fluorinated storage containers of the present invention are relatively easy to manufacture since fluorination time can be relatively short. A short time has economic advantages and reduces the risk of "fluorine fire" hazard.

Fluorinated storage containers of the present invention are further illustrated by the following examples. Rigidex is a registered trademark. All the containers used in the examples had a wall thickness in excess of 1 millimetre.

EXAMPLE 1

Three containers produced from Rigidex X4RR also known as Rigidex 2000 which is polyethylene having a density of 0.953 and a melt index of 0.2 gram/10 mins. were exposed to fluorine at room temperature for 1 minute, 2 minutes and 1 hour respectively. The fluorine was generated in an electrolytic cell and the current adjusted so that the flow of fluorine was about 15 litres/hour. A ½ inch copper pipeline was used to convey the fluorine from the generating cell to a well ventilated fume cupboard where the fluorine was released inside the containers so that only their internal surfaces were treated.

The fluorinated containers together with an untreated container were each filled with gasoline (4 star National) and sealed by welding untreated polyethylene sheet to the container necks. The containers were then allowed to stand at room temperature for up to 42 days. The weight losses by permeation for containers exposed to fluorine for varying times and for the control container which had not been exposed to fluorine but was identical in all other respects were then estimated and the results are given in Table 1.

TABLE 1

| Exposure times to fluorine | Fluorine absorbed, micrograms/cm.$^2$ | Gasoline weight loss | Period of storage (days) | Permeation loss, mg./sq. cm./100 hrs. |
|---|---|---|---|---|
| Control | 0 | 11.9 | 42 | 4.2 |
| 1 minute | 1.5 | 0.56 | 25 | 0.33 |
| 2 minutes | 3.0 | 0.16 | 42 | 0.06 |
| 1 hour | 25.4 | 0.033 | 42 | 0.11 |

These results show the dramatically reduced permeability to gasoline of containers made from polymers having as little as 1.5 micrograms per square centimetre of absorbed fluorine. The polymer is rendered almost impermeable by 3.0 milligrams of fluorine per square centimetre and the further improvement thereafter lacks practical importance.

EXAMPLE 2

A number of containers were fluorinated for 5 minutes at room temperature using the procedure described in Example 1. The weight of fluorine absorbed per square centimetre of polymer surface was 7.4 micrograms.

These containers were filled with gasoline and sealed again using the procedure described in Example 1. They were then stored for 100 hours together with an untreated control container at temperatures of 20, 40 and 50° C. The gasoline loss in the contaners was calculated and the results are given in Table 2.

TABLE 2

| | Weight loss of gasoline in mg./sq. cm./100 hrs. | |
|---|---|---|
| | Control, untreated containers | Fluorinated containers |
| Temperature,° C.: | | |
| 20 | 4.2 | 0.07 |
| 40 | -- | 2.9 |
| 50 | 40 | 9 |

These results again demonstrate the dramatic reduction in permeability of the treated containers in comparison with the control.

EXAMPLE 3

A number of containers were treated with fluorine in the manner described in Example 1. The time of exposure to fluorine was varied up to a maximum of 20 minutes and the weight of fluorine absorbed determined by weighing before and after exposure. The fluorine absorbed in micrograms per square centimetre is shown in Table 3.

TABLE 3

| Exposure time to F$_2$ | Weight increase, milligrams | Weight increase calculated as μg./cm.$^2$ |
|---|---|---|
| 1 minute | 0.4 | 1.5 |
| 2 minutes | 0.8 | 3.0 |
| 5 minutes | 2.1 | 7.4 |
| 10 minutes | 4.4 | 15.5 |
| 15 minutes | 5.9 | 20.9 |
| 20 minutes | 7.6 | 26.8 |

All the treated containers showed reduced permeability to gasoline.

EXAMPLE 4

A number of blow mouldings shaped as flat rectangular conventional metal car gasoline tanks were produced from Rigidex Type 2000. They were 8 gal. nominal capacity, weighed 8 lbs. and had an internal surface area of approximately 2000 sq. in. Half of the tanks were treated internally by feeding undiluted fluorine gas obtained directly from an electrolytic cell into the tanks and displacing the air. The flow rate of fluorine to each tank was about 200 litres per hour and the total time of each treatment about 20 minutes. Thus the exposure time to undiluted fluorine for each tank, allowing for the time taken in displacing air, was less than 20 minutes. The weight of fluorine absorbed per square centimetre of polymer surface was 15 micrograms. The tanks were filled with 6 gallons of a 100 octane aromatic gasoline fuel, sealed, and stored at 70° F. and 110° F. The fuel loss by permeation was measured by direct weighing and the stability of the gasoline by gum content and octane rating measurements.

| | Treated HDPE tanks | Control HDPE tanks |
|---|---|---|
| 70° F. storage: | | |
| Permeation loss, g. after: | | |
| 1 week | 1 | 23 |
| 5 weeks | 12 | 139 |
| 3 months | 31 | 480 |
| I.P. gum, mg./100 ml.: | | |
| Initial | 1 | 1 |
| After 24 weeks | 1 | 3 |
| 110° F. storage: | | |
| Permeation loss, g. after: | | |
| 1 week | 28 | 199 |
| 5 weeks | 120 | 879 |
| I.P. gum, mg./100 ml.: | | |
| Initial | 1 | 1 |
| After 24 weeks | 2 | 9 |

The I.P. gum measurements were obtained in accordance with Institute of Petroleum Test Method 131/65.

The gasolines stored in both treated and untreated tanks were in satisfactory condition at the end of the test period but the treated tank fuel showed the advantage of lower gum content. The permeation resistance of the treated tanks was considered good enough to assist compliance of the U.S. Federal Register [1] regulations. On the other hand, the loss from the untreated tanks come close to the limit of the fuel vapour loss allowed for the whole vehicle.

I claim:

1. A thick walled storage container for gasoline having a wall thickness greater than 1 millimetre, fabricated from a high density polyethylene, a high density copolymer of ethylene with up to 20% by weight of copolymerisable monomer, or a blend of the high density polyethylene or the high density copolymer with a low density polyethylene, the high density polyethylene, high density copolymer or blend having a density in the range 0.935 to 0.965 and a melt index in the range 0.05 to 5.0, and having at least one surface of the container fluorinated to a concentration of 0.01 to 30 micrograms of fluorine per square centimetre of surface area.

2. A thick walled storage container for gasoline as claimed in claim 1 having the inner surface of the container fluorinated to a concentration of 0.01 to 30 micrograms of fluorine per square centimetre of surface area.

3. A thick walled storage container for gasoline as claimed in claim 1 having a wall thickness of about 3 millimetres.

4. A thick walled storage container for gasoline as claimed in claim 1, having at least one surface of the container fluorinated to a concentration of 1.0 to 10.0 micrograms per square centimetre of surface area.

5. A process for the production of a container for gasoline which comprises exposing at least one surface of a container, having a wall thickness greater than 1 millimetre and

---

[1] Control of air pollution for new motor vehicles and motor vehicle engines. Federal Register, vol. 33, No. 108, June 4, 1968, part 2, Department of Health, Education, and Welfare.

fabricated from a high density polyethylene, a high density copolymer of ethylene with up to 20% by weight of the copolymerisable monomer, or a blend of the high density polyethylene or the high density copolymer with a low density polyethylene, the high density polyethylene, high density copolymer or blend having a density in the range 0.935 to 0.965 and a melt index in the range 0.05 to 5.0, to gaseous fluorine for 1 to 20 minutes until the surface is fluorinated to a concentration of 0.01 to 30 micrograms per square centimetre of surface area.

6. A process as claimed in claim 5 wherein the fluorination is carried out at a temperature in the range 15 to 25° C.

References Cited

UNITED STATES PATENTS

| | | | |
|---|---|---|---|
| 3,563,846 | 2/1971 | Harr | 161—165 |
| 3,505,167 | 4/1970 | Smarook | 161—189 |
| 2,788,306 | 4/1957 | Cox et al. | 156—309 X |
| 2,811,468 | 10/1957 | Joffre | 260—94.9 X |
| 3,060,164 | 10/1962 | Canterino | 260—94.9 |
| 3,454,461 | 7/1969 | Paxton | 161—189 |

HAROLD ANSHER, Primary Examiner

U.S. Cl. X.R.

150—0.5; 161—189; 260—94.9 H